United States Patent
Spahlinger

(10) Patent No.: US 7,324,206 B2
(45) Date of Patent: Jan. 29, 2008

(54) METHOD FOR DETERMINATION/COMPENSATION OF BIAS ERRORS/RANDOM WALK ERRORS INDUCED BY THE LIGHT SOURCE IN FIBER-OPTIC SAGNAC INTERFEROMETERS

(75) Inventor: Guenter Spahlinger, Stuttgart (DE)

(73) Assignee: LITEF GmbH, Freiburg (DE)

( * ) Notice: Subject to any disclaimer, the term of this patent is extended or adjusted under 35 U.S.C. 154(b) by 99 days.

(21) Appl. No.: 10/569,659

(22) PCT Filed: Aug. 25, 2004

(86) PCT No.: PCT/EP2004/009493

§ 371 (c)(1),
(2), (4) Date: Feb. 24, 2006

(87) PCT Pub. No.: WO2005/024344

PCT Pub. Date: Mar. 17, 2005

(65) Prior Publication Data

US 2007/0008543 A1 Jan. 11, 2007

(30) Foreign Application Priority Data

Aug. 29, 2003 (DE) .................. 103 39 889

(51) Int. Cl.
*G01C 19/72* (2006.01)
(52) U.S. Cl. .................. 356/464; 356/460
(58) Field of Classification Search ........... 356/460, 356/464, 483
See application file for complete search history.

(56) References Cited

U.S. PATENT DOCUMENTS

| | | | |
|---|---|---|---|
| 6,204,921 B1 * | 3/2001 | Strandjord et al. | 356/460 |
| 6,445,455 B1 * | 9/2002 | Hall et al. | 356/460 |
| 6,542,651 B2 | 4/2003 | Bennett | |

FOREIGN PATENT DOCUMENTS

| | | |
|---|---|---|
| DE | 19730522 | 5/1999 |
| DE | 10025395 | 1/2002 |
| DE | 10044197 | 4/2002 |
| EP | 0442747 | 8/1991 |
| EP | 0551537 | 7/1993 |
| WO | 9514907 | 6/1995 |
| WO | 9904222 | 1/1999 |
| WO | 03058168 | 7/2003 |

* cited by examiner

*Primary Examiner*—Michael A. Lyons
(74) *Attorney, Agent, or Firm*—Elliott N. Kramsky

(57) ABSTRACT

A method for determination of/compensation for the bias/random walk errors induced by the light source in fiber-optic Sagnac interferometers employing a modulation method for stochastically independent shifting of the operating point to the points of highest sensitivity. A reference beam is output from the light beam emitted from the light source of the interferometer and passed to the fiber coil to produce a proportional reference intensity signal. Such signal is demodulated with the demodulation pattern of the rotation rate control loop to demodulate the rotation rate intensity signal (proportional to rotation rate). The demodulated reference intensity signal measures the bias/random walk errors to be determined. Demodulation of the reference intensity signal is simultaneous with that of the rotation rate intensity signal so that components of the reference and rotation rate intensity signals (each resulting from light components simultaneously emitted from the light source) are identically demodulated.

6 Claims, 3 Drawing Sheets

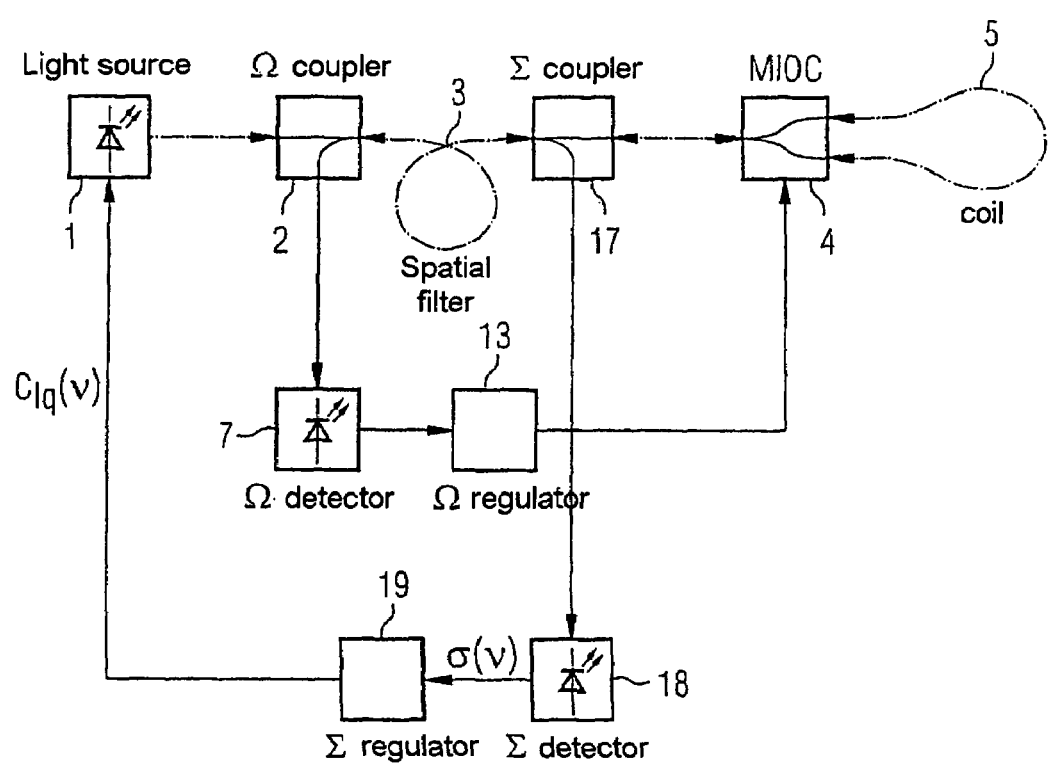

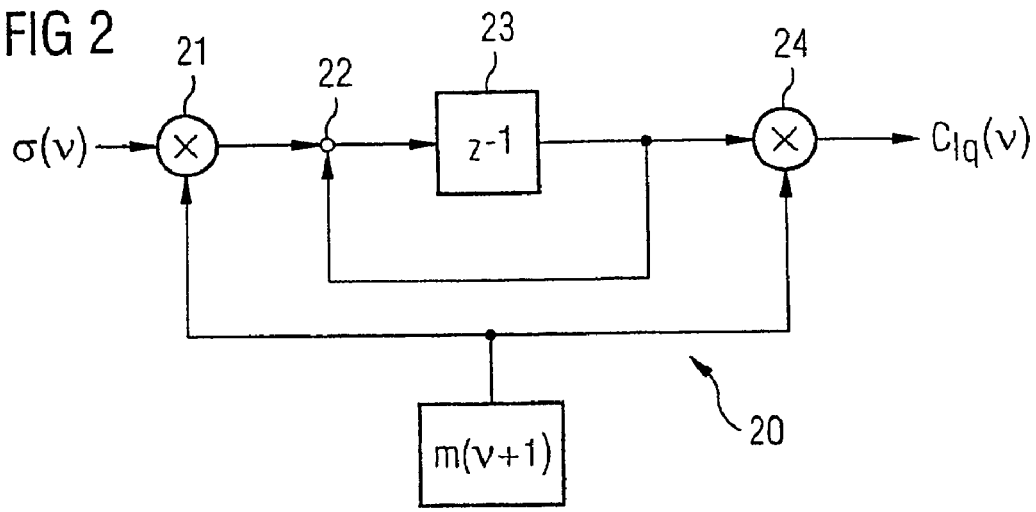
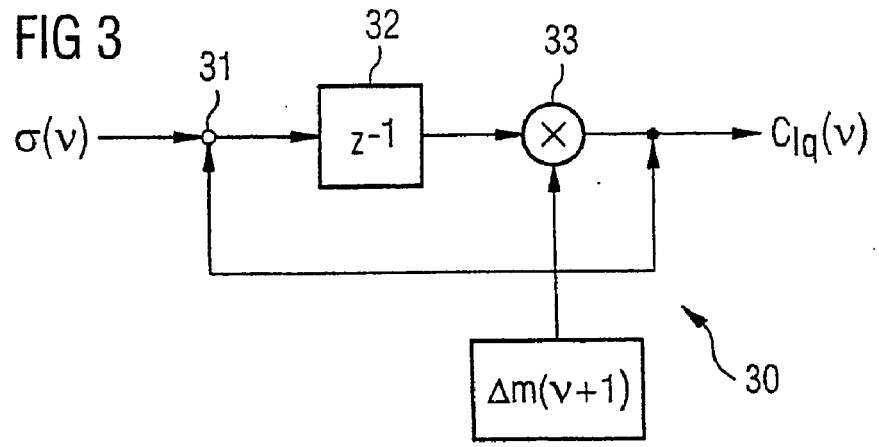
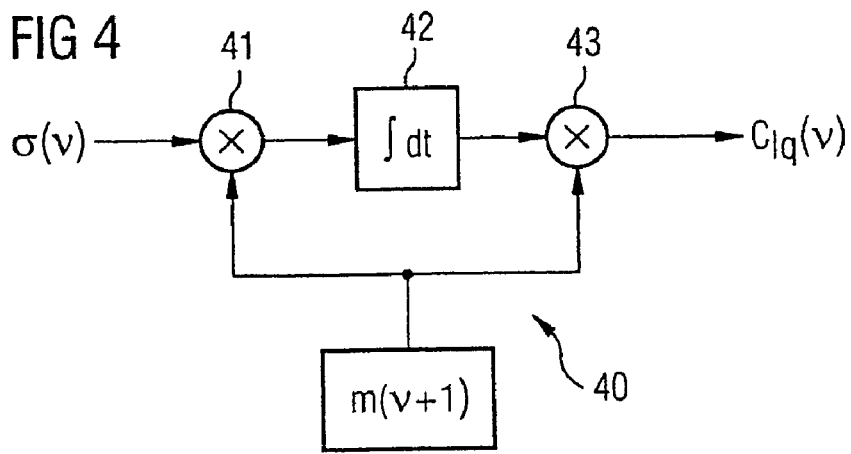

METHOD FOR DETERMINATION/COMPENSATION OF BIAS ERRORS/RANDOM WALK ERRORS INDUCED BY THE LIGHT SOURCE IN FIBER-OPTIC SAGNAC INTERFEROMETERS

BACKGROUND

The present invention relates to fiber-optic Sagnac interferometers. More particularly, this invention pertains to a method for determination of/compensation for bias/random walk errors induced by the light source in fiber-optic Sagnac interferometers.

DESCRIPTION OF THE PRIOR ART

Sagnac interferometers allow excellent measurement accuracy. Component requirements are correspondingly stringent. The light source is central as light source noise can corrupt the rotation rate signal severely. Amplitude noise from the light source can cause errors known as "random walk". Furthermore, bias errors can be produced by electrical interference effects radiated into a light source supply voltage signal.

In order to avoid such errors, it is known to tap off a proportion of the light power in the form of a reference signal from the light beam emitted from the light source before it is fed into the fiber coil of the interferometer. This is converted to a corresponding intensity signal by a monitor diode. The intensity signal can then be evaluated to reduce errors dependent upon the light source. One possibility is to demodulate the intensity signal supplied from the monitor diode and to subtract the resulting error signal from the determined rotation rate signal (compensation method). Another possibility, described, for example, in U.S. Pat. No. 6,204,921, is to use the intensity signal produced by the monitor diode as the controlled variable in a control loop for controlling the light source current/the light sources. The amplitude noise from the light source can be reduced by such means. However, only P regulators can be employed in this method as, although I regulators result in the control error of the intensity signal integrated over an infinitely long time tending to zero, a bias or random walk error from the gyro that tends to zero requires, in contrast, the integral of the intensity signal multiplied by the demodulator (i.e. by the modulation signal) to be brought to zero. This requirement cannot be easily satisfied by simple analog regulators. Further, such method can only be implemented with a continuous regulator.

SUMMARY AND OBJECTS OF THE INVENTION

It is therefore an object of the invention to provide a method of greater accuracy than conventional methods for determination of/compensation for the bias/random walk errors induced by the light source in fiber-optic Sagnac interferometers.

The invention addresses the preceding and other objects by providing, in a first aspect, a method for determination of/compensation for bias/random walk errors induced by the light source in fiber-optic Sagnac interferometers that use a modulation method for stochastically independent shifting of the operating point to the points of highest sensitivity. Such method includes the step of outputting a reference beam from the light passing through the interferometer using a coupler so that the intensity of the reference beam is proportional to the intensity of the light injected into the fiber optics of the interferometer but not subject to any changes caused by modulation and/or resetting processes.

A reference intensity signal is produced that is proportional to the intensity of the reference beam. This is accomplished by tapping the output signal from a photodetector to which the reference beam is applied.

The reference intensity signal is demodulated using the demodulation pattern used in the rotation rate control loop. Such signal is used for demodulation of the rotation rate intensity signal (which is proportional to the rotational rate) using a demodulator. A demodulated reference intensity signal is obtained by the demodulator that represents a measure of the bias/random walk errors to be determined. The demodulation of the reference intensity signal is matched in time to the demodulation of the rotation rate intensity signal. In this way, the signal components of the reference intensity signal and the rotation rate intensity signal that result from light components simultaneously emitted from the light source are identically demodulated.

In another aspect, the invention provides a fiber-optic Sagnac interferometer that employs a modulation method for stochastically independent shifting the operating point to the points of highest sensitivity. Such interferometer includes a coupler for outputting a reference beam from light emitted from the interferometer light source so that the intensity of the reference beam is proportional to that of the light injected into the fiber optics of the interferometer. It is not subject to any changes caused by modulation and/or resetting processes.

A photodetector is provided. The reference beam is applied to such photodetector whose output signal is proportional to the intensity of the reference beam. A demodulator demodulates the reference intensity signal using the demodulation pattern used in the rotation rate control loop for demodulation of the rotation rate intensity signal. Such signal is proportional to rotation rate so that an output signal from the demodulator represents a measure of the bias/random walk errors to be determined.

The demodulator is matched in time to demodulation of the rotation rate intensity signal so that the signal components of the reference intensity signal and the rotation rate intensity signal (each of which result from light components simultaneously emitted from the light source) are identically demodulated.

The foregoing and other features of the invention will become further apparent from the detailed description that follows. Such description is accompanied by a set of drawing figures. Numerals of the drawing figures, corresponding to those of the written description, point to features of the invention. Like numerals refer to like features throughout both the written description and the drawing figures.

BRIEF DESCRIPTION OF THE DRAWINGS

FIG. 1 is a schematic diagram illustrating a preferred embodiment of an interferometer in accordance with the invention;

FIG. 2 illustrates a first preferred embodiment of a regulator in accordance with the invention;

FIG. 3 illustrates a second preferred embodiment of a regulator in accordance with the invention;

FIG. 4 illustrates a third preferred embodiment of a regulator in accordance with the invention.

DETAILED DESCRIPTION OF THE PREFERRED EMBODIMENT

Figure 5:
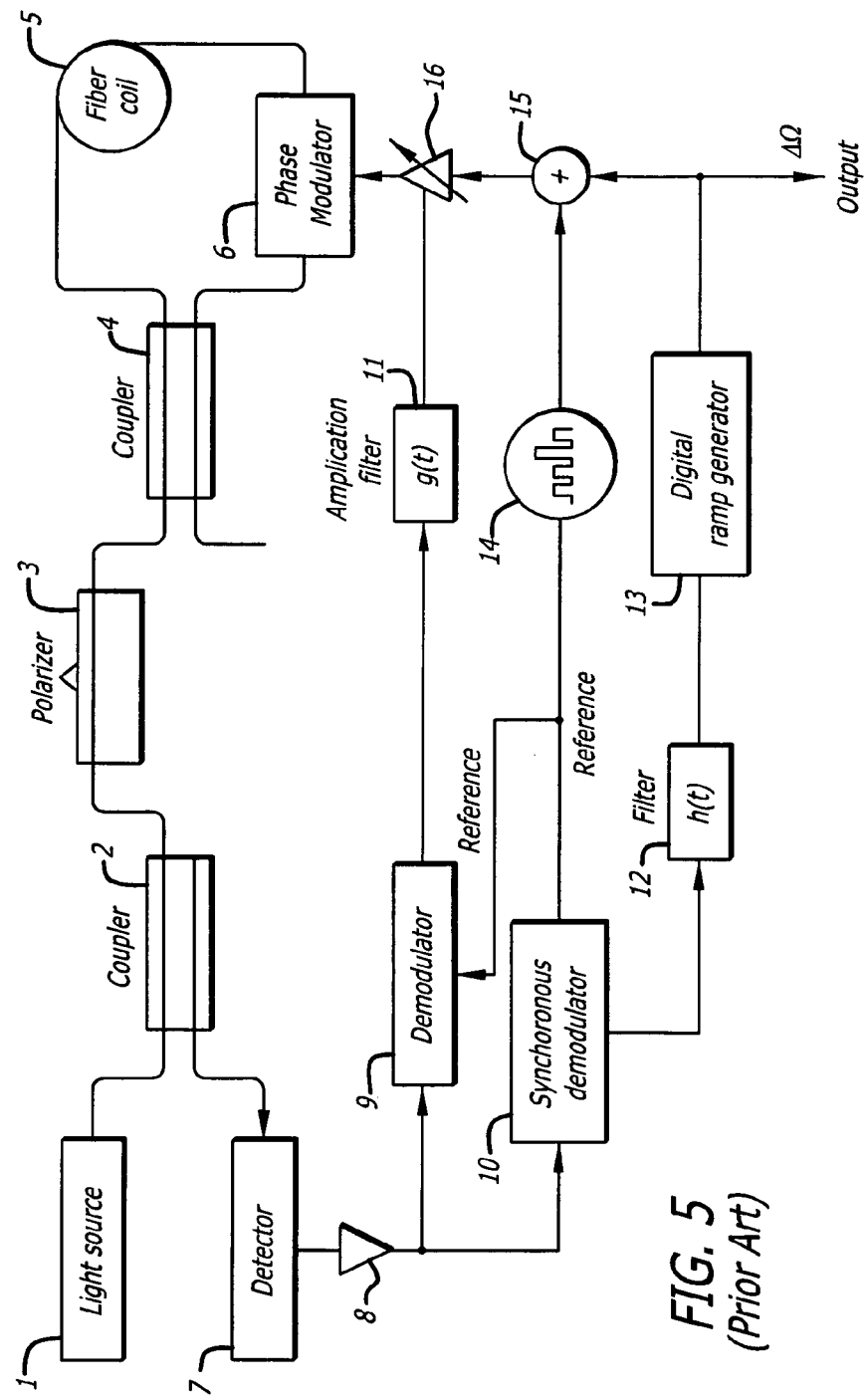
FIG. 5 is a schematic diagram of a closed-loop fiber-optic Sagnac interferometer in accordance with the prior art.

FIG. 5 is a schematic diagram of a closed-loop Sagnac interferometer in accordance with the prior art. To assist an understanding of the invention, the following text briefly describes the method of operation of a closed-loop Sagnac interferometer that employs a modulation method for stochastically independent shifting of the interferometer characteristic or of the operating point of the interferometer to the points of highest sensitivity.

Referring to FIG. 5, the light from a light source 1 of stabilized intensity and wavelength is passed via a fiber path to a first beam splitter 2, and, from there via a polarizer 3, to a second beam splitter 4. The beam elements produced by splitting are passed from the two outputs/inputs remote from the light source 1 to the two inputs/outputs of a fiber coil 5. A phase modulator 6 is arranged between the outputs/inputs of the second beam splitter 4 and the inputs/outputs of the fiber coil 5. The beam elements, which interfere in the second beam splitter 4 after passing through the fiber coil 5, once again pass through the polarizer 3, and as great a proportion as possible is passed via the first beam splitter 2 to a photodetector 7. The output signal from the photodetector 7 is first amplified by an amplifier 8, then applied to a demodulator 9 and a synchronous demodulator 10. Together with an amplification filter 11, the demodulator 9 forms a scale factor control path. The synchronous demodulator 10 employs a filter 12 to drive a ramp generator 13 that is used to produce a reset signal. The signal produced by a modulation oscillator 14 to shift the operating point to that of highest sensitivity and the reset signal are combined at an adder 15 to form a single signal. Such signal is the input to a controllable amplifier 16 that amplifies it by an output signal from the amplification filter 11 that is used as a gain factor. The output signal from the controllable amplifier 16 is, in turn, used to drive the phase modulator 6.

The interferometer according to the invention will now be described in more detail with reference to FIG. 1, a schematic description of a preferred embodiment of an interferometer in accordance with the invention. Components and devices that correspond to those shown in FIG. 5 are identified by the same reference numerals.

The light produced by a light source 1 is passed via a first coupler 2, a spatial filter 3 and a second coupler 17 to a main beam splitter 4. The beam elements produced at the main beam splitter 4 pass through a fiber coil 5 and are combined to form an interference beam. Such interference beam is passed via the second coupler 17 and the spatial filter 3 to the first coupler 2 that outputs a specific proportion of the interference beam and passes it to a rotation rate detector 7. An output signal from the rotation rate detector 7 (an intensity signal proportional to the rotation rate) is applied to a rotation rate regulator 13 that controls a phase modulator (not shown) so that the measured rotation rate disappears. (The components for stochastically independent shifting of the interferometer characteristic, or operating point, of the interferometer to the points of highest sensitivity are not shown in FIG. 1 for clarity.)

The interferometer of FIG. 1 essentially differs from that of FIG. 5 by the addition of a control loop for controlling light source power. Such control loop includes the second coupler 17, a light power detector 18 and a light power regulator 19. The second coupler 17 outputs a reference beam taken from the light beam coming from the light source and passing toward the fiber coil 5. This is supplied to the light power detector 18. An output signal from the light power detector 18, σ(ν), proportional to the intensity of the reference beam, is applied to the light power regulator 19 that controls light source power as a function of it to compensate for bias/random walk errors. (The expression "fiber optics in the interferometer" in the exemplary embodiment illustrated in FIG. 1 refers in particular to the components annotated with the reference numbers 1, 2, 3, 4, 5 and 17 and to the fiber paths between them.)

FIG. 2 illustrates a first preferred embodiment 20 of the light power regulator 19 in accordance with the invention. A time-discrete method is described in conjunction with such embodiment that can be carried out digitally. A continuous (analog) version of such method is also possible.

The signal σ(ν) produced and sampled by the light power detector 18 (preferably in synchronism with the rotation rate detector) is demodulated in a demodulator 21 (i.e. multiplied by the demodulation signal m(ν+1)). The demodulation signal m(ν)ϵ{−1,1} is the same demodulation signal as that employed in the rotation rate control loop (i.e. the random demodulation signal from the main control loop, the demodulation signal used by the demodulators with the reference numbers 9 and 10 in FIG. 5 produced by the modulation oscillator 14). In theory, the demodulation signal is the same as that of the main control loop.

The choice of demodulation signal is open. It is possible, for example, to use deterministic modulation/demodulation. In such case, the parameter ν would represent a discrete time-dependent value. Since signal components output at the same time from the light source 1 arrive at the rotation rate detector 7 and the light power detector 18 at different times, the demodulation signal and the demodulation pattern m(ν) must be made available to the two detectors at different times. In such an embodiment, the respective fiber paths to the detectors 7 and 18 are such that a relay time difference of one working clock cycle of the interferometer is created. The light power detector 18 is therefore provided with the demodulation signal m(ν) with a negative delay ("leading" by one working clock cycle) as this detector receives the light one working clock cycle earlier than the rotation rate detector 7. The demodulated signal (i.e. the signal multiplied by m(ν+1)) is passed via an adder stage 22 to an accumulator 23 that integrates the input signal and supplies the integrated output signal to a modulator 24. Such modulator 24 multiplies the integrated signal by the demodulation signal m(ν+1) and produces a corresponding output signal clq(ν) for driving the light source 1. The integrated signal modulated with m(ν+1) is applied to the light source current (with a negative mathematical sign) by such means. This insures that the different gradients of the intensity curve at the points of highest sensitivity are taken into account (i.e. long-term correlations of σ(ν) with m(ν+1) disappear). Long-term correlations of the light source noise with the demodulation signal of the rotation rate regulator 7 are thus eliminated.

Should the five paths from the light source 1 to the rotation rate detector 7 and the light power detector 18 be of equal lengths (e.g. by provision of an additional fiber coil in the fiber path between the second coupler 17 and the light power detector 18), there is no need to shift the demodulation patterns by one working clock cycle. All that is then required is to insure that signal components in the output signal from the rotation rate detector 7 and from the light power detector 18 that result from light components emitted simultaneously from the light source 1 are identically demodulated.

FIG. 3 illustrates a second preferred embodiment of a regulator 30 in accordance with the invention. The light power regulator 30 supplies the output signal from the light power detector 18 to an accumulator 32 via an adder stage 31. An integrated output signal from the accumulator 32 is supplied to a demodulator 33 that demodulates the signal with a signal $\Delta m(v+1)=m(v+1)\cdot m(v)$. The regulators of FIGS. 2 and 3 are interchangeable, producing the same output signal for the same input signal.

The method described above is time-discrete and can be implemented in the digital electronics of the interferometer. Such method takes account of the given demodulation pattern and eliminates long-term correlations between light source noise and the demodulation signal from the main (rotation rate) regulator. It is based on an additional regulator (the light power regulator) that receives its input from a monitor photodiode and whose output modulates the light source 1 power such that "rotation rate components" disappear from the light signal.

The method described above can also be implemented in analog form. FIG. 4 illustrates a third preferred embodiment, an analog regulator 40, used for this purpose. It supplies the output signal from the light power detector 18 to an analog multiplier 41 where it is multiplied by the demodulation signal $m(v+1)$ from the main control loop. The demodulated signal is supplied to an analog integrator 42. The output of the analog integrator 42 is supplied to an analog multiplier 43 that multiplies this signal by the demodulation signal $m(v+1)$. The corresponding output signal $clq(v)$ controls light source current.

One idea on which the invention is based is that, when using a modulation method for stochastically independent shifting of the operating point to the points of highest sensitivity, the demodulation pattern of the rotation rate control loop should be taken into account in the determination of bias/random walk errors which are specific to the light source. This is because the gradients of the intensity curve at the points of highest sensitivity have different mathematical signs, which lead to "incorrect" intensity signals if they are not taken into account.

As mentioned above, demodulation of the reference intensity signal preferably leads demodulation of the rotation rate intensity signal by one interferometer working clock cycle. The expression "working clock cycle" refers to the time for the light to pass through the fiber coil.

To compensate for determined bias/random walk errors, a corresponding light source drive signal is produced and light source power is controlled on the basis of the demodulated reference intensity signal such that the determined bias/random walk errors are compensated.

As already mentioned, the reference beam can be output at any desired point between the light source and the fiber coil of the interferometer. In this case, the following should be taken into account: the reference beam can in principle be tapped off at any point where its intensity is proportional to the intensity that is fed into the optics of the FOG and is still independent of the modulation and resetting signals that are applied by virtue of the operation of the FOG. If required, this signal can also be tapped off from a monitor detector located directly adjacent the light source. In principle, however, it must be borne in mind that the light from the light source is composed directly after it enters the fiber of more polarization states and modes than is the case, finally, at the end of the overall optical path (i.e. directly upstream of the photodetector of the rotation rate regulator) since the path contains mode and polarization filters. It is of critical importance that the monitor detector "see" precisely those modes and polarization states that the detector for the rotation rate regulator also sees. Were the monitor detector to be supplied with further modes and polarization states, then, on average, it would regulate the demodulated sum of all of such components to zero. The effective state/mode would then have to compensate for the ineffective states/modes. This would result in an increased rotation rate error/random walk in the rotation rate control loop, which reacts only to the effective state/mode. This would, of course, be counter-productive for the purposes of the idea according to the invention.

The output signal from the demodulator is a measure of the bias/random walk errors to be determined. The demodulator is matched in time to the demodulation of the rotation rate intensity signal so that the signal components of the reference intensity signal and the rotation rate intensity signal (which each result from light components emitted from the light source at the same time) are demodulated in an identical manner. To achieve this, it is possible, for example, to relate the path lengths the light travels from the light source to the photodetector to produce the rotation rate intensity signal (proportional to rotation rate) and to produce the reference intensity signal to one another such that they differ by the path length which the light travels during one interferometer working clock cycle. The demodulation patterns (which are identical) are accordingly then shifted through one interferometer working clock cycle with respect to one another.

The interferometer preferably has a regulator which controls the light source power on the basis of the output signal from the demodulator, such that the determined bias/random walk errors are compensated for. Together with the demodulator and the photodetector, the regulator forms a corresponding control path.

A method and interferometer according to the invention offers the following features in contrast to the prior art: 1) suitability for fiber gyros with random modulation as it includes the random modulation/demodulation pattern (the random modulation method is explained in greater detail, for example, in European patent specification EP 0 551 537 B1); 2) implementation of an integrating, optionally analog or discrete, control loop including a monitor diode and a light-source intensity modulator to nullify interference and noise signals in the light source signal that otherwise lead to long-term errors (random walk and bias) in the gyro signal; and 3) the rotation rate detector and the light power detector can be designed identically (including sampling times, optimal filters and blanking), to obtain maximum compensation.

While this invention has been disclosed with reference to its presently-preferred embodiment, it is not limited thereto. Rather, the invention is limited only insofar as it is defined by the following set of patent claims and includes within its scope all equivalents thereof.

What is claimed is:

1. A method for determination of/compensation for bias/random walk errors induced by the light source in fiber-optic Sagnac interferometers which use a modulation method for stochastically independent shifting of the operating point to the points of highest sensitivity, comprising the following steps:

outputting of a reference beam from the light passing through the interferometer using a coupler, in such a way that the intensity of the reference beam is proportional to the intensity of the light injected into the fiber optics of the interferometer, but is not subject to any changes caused by modulation and/or resetting processes:

production of a reference intensity signal which is proportional to the intensity of the reference beam by tapping the output signal from a photodetector to which the reference beam is applied;

demodulation of the reference intensity signal using the demodulation pattern which is used in the rotation rate control loop and is used for demodulation of the rotation rate intensity signal, which is proportional to the rotational rate, using a demodulator, by which means a demodulated reference intensity signal is obtained which represents a measure of the bias/random walk errors to be determined, with the demodulation of the reference intensity signal being matched in time to the demodulation of the rotation rate intensity signal such that the signal components of the reference intensity signal and of the rotation rate intensity signal which each result from light components emitted from the light source at the same time are demodulated in an identical manner.

2. The method as claimed in claim 1, characterized in that the demodulation of the reference intensity signal precedes the demodulation of the rotation rate intensity signal by one interferometer working clock cycle.

3. The method as claimed in claim 1, characterized in that the light source power is controlled on the basis of the demodulated reference intensity signal such that the determined bias/random walk errors are compensated for.

4. A fiber-optic Sagnac interferometer which uses a modulation method for stochastically independent shifting of the operating point to the points of highest sensitivity, having:

a coupler for outputting a reference beam from light which is emitted from the light source of the interferometer, in such a way that the intensity of the reference beam is proportional to the intensity of the light injected into the fiber optics of the interferometer, but is not subject to any changes caused by modulation and/or resetting processes;

a photodetector, to which the reference beam is applied and whose output signal is proportional to the intensity of the reference beam, a demodulator for demodulation of the reference intensity signal using the demodulation pattern which is used in the rotation rate control loop and is used for demodulation of the rotation rate intensity signal, which is proportional to the rotation rate, such that an output signal from the demodulator represents a measure of the bias/random walk errors to be determined, with the demodulator being matched in time to the demodulation of the rotation rate intensity signal such that the signal components of the reference intensity signal and of the rotation rate intensity signal which each result from light components emitted from the light source at the same time are demodulated in an identical manner.

5. The interferometer as claimed in claim 4, characterized in that the path lengths which the light must travel from the light source to the photodetector in order to produce the rotation rate intensity signal which is proportional to the rotation rate, and to the photodetector in order to produce the reference intensity signal are related to one another in such a way that they differ by the path length which the light travels in one interferometer working clock cycle, and the demodulation patterns are shifted in a corresponding manner with respect to one another by one interferometer working clock cycle.

6. The interferometer as claimed in claim 4, characterized by a regulator, which controls the light source power on the basis of the output signal from the demodulator such that the determined bias/random walk errors are compensated for.

* * * * *